(12) United States Patent  (10) Patent No.: US 8,366,229 B2
Kuczynski et al.  (45) Date of Patent: Feb. 5, 2013

(54) INDICATION OF PRINT MEDIA QUALITY TO PRINTER USERS

(75) Inventors: Joseph Kuczynski, Rochester, MN (US); Hye S. Makley, Morrisville, NC (US); Melissa K. Miller, Durham, NC (US); Heidi D. Williams, Cary, NC (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 12/767,835

(22) Filed: Apr. 27, 2010

(65) Prior Publication Data

US 2011/0261105 A1  Oct. 27, 2011

(51) Int. Cl.
B41J 29/38 (2006.01)
(52) U.S. Cl. .................. 347/16; 347/1; 347/19
(58) Field of Classification Search .......... 347/5, 9, 347/16, 1, 19
See application file for complete search history.

(56) References Cited

U.S. PATENT DOCUMENTS

| | | | |
|---|---|---|---|
| 5,004,928 A | 4/1991 | Suzuki et al. | |
| 5,280,274 A | 1/1994 | Uemura et al. | |
| 5,844,682 A | 12/1998 | Kiyomoto et al. | |
| 5,925,889 A | 7/1999 | Guillory et al. | |
| 6,006,668 A | 12/1999 | Rehmann | |
| 6,818,276 B2 | 11/2004 | Bourdelais et al. | |
| 7,184,166 B2 | 2/2007 | Otsuki | |
| 7,507,981 B2 | 3/2009 | Saxena et al. | |
| 7,582,888 B2 | 9/2009 | Shinno et al. | |
| 7,646,479 B2 | 1/2010 | Kokubo | |
| 2003/0044189 A1 | 3/2003 | Okitsu et al. | |
| 2003/0137679 A1* | 7/2003 | Nakazawa et al. | 358/1.6 |
| 2007/0127965 A1 | 6/2007 | Pagan et al. | |
| 2010/0002039 A1 | 1/2010 | Kikuchi et al. | |

FOREIGN PATENT DOCUMENTS

| | | |
|---|---|---|
| JP | 2004-237489 A | 8/2004 |
| JP | 2005-111674 A | 4/2005 |
| JP | 2005-202177 A | 7/2005 |

* cited by examiner

Primary Examiner — Lam S Nguyen
(74) Attorney, Agent, or Firm — Olive Law Group, PLLC; Thomas E. Tyson (57) ABSTRACT

A printing system for indicating print media quality to printer users includes a printing assembly configured to route print media along a pathway for printing. In an example, the system includes, but is not limited to, a thermal printer having a thermal print head for printing onto paper. The system also includes a light meter configured to detect light reflected from the print media, such as the paper. The light meter also measures a characteristic of the detected light. An indicator is coupled to the light meter, and configured to present a quality level of the print media to a user based on the measured characteristic of the detected light.

16 Claims, 3 Drawing Sheets

INDICATION OF PRINT MEDIA QUALITY TO PRINTER USERS

BACKGROUND

1. Field of the Invention

The present invention relates to printers, and more specifically, to methods and systems for indicating print media quality to printer users.

2. Description of Related Art

Thermal printers produce printed images by selectively heating coated thermochromic paper, or thermal paper, when the paper passes along a pathway near a thermal print head. The coating is darkened in areas where the paper is heated such that text or images are produced. A thermal printer usually includes a thermal print head, platen, spring, and controller. The thermal print head generates heat for printing on the paper. The platen may include one or more rollers for feeding the paper along a pathway for printing. The spring applies pressure to the thermal print head, causing it to contact the paper. The controller controls the mechanism and may perform other tasks, such as controlling the display of information to the printer user. Often, thermal printers include a cutter blade assembly for cutting the paper.

Over time printer components will sometimes require replacement due to normal wear. Printer wear may be unduly hastened when low-quality papers or other low-quality print media are used. Calcium carbonate is a filler often used in low-quality papers to produce an economical paper having a bright appearance. Calcium carbonate can be more abrasive than other fillers, causing printer components, such as the thermal print head and the cutter blade assembly to wear more quickly than if high-quality papers were used for printing. For these reasons, printer manufacturers often recommend the use of high-quality papers for use with their printers.

Many printer users are unaware that the paper being used is low-quality paper or that the paper is not recommended by the printer's manufacturer. It may be impossible or difficult for a user to detect low-quality paper based on visual inspection alone. To be assured that recommended, high-quality paper will be used, the printer user must inconveniently check whether the paper is among those approved by the printer manufacturer for use with the printer. Accordingly, there is a need for convenient methods and systems for indicating print media quality to printer users.

BRIEF SUMMARY

One or more embodiments of the present invention provide a printing system for indicating print media quality to printer users. The print media may be, for example, paper or any other suitable object or material upon which text or images may be printed by a printer. The system includes a printing assembly configured to route print media along a pathway for printing. In an example, the system may include, but is not limited to, a thermal printer having a thermal print head for printing onto paper. The system also includes a light meter configured to detect light reflected from the print media. The light meter also measures a characteristic of the detected light. An indicator is coupled to the light meter, and is configured to present a quality level of the print media to a user based on the measured characteristic of the detected light.

One or more embodiments of the present invention provide a printing system that includes a light meter configured to detect light reflected from the print media. The light meter may also measure a gloss characteristic of the print media based on the detected light. A computing unit compares the gloss characteristic measurement to a predetermined value. The system includes an indicator coupled to the computing unit. The indicator is configured to present a quality level of the print media to a user based on the comparison of the gloss characteristic measurement to the predetermined value.

DETAILED DESCRIPTION

Exemplary systems and methods for indicating or presenting a quality level of print media to a printer user in accordance with embodiments of the present invention are described herein. Particularly, described herein are exemplary systems and methods for determining or estimating a quality level of print media loaded into or being used by a printing system or printer, such as, but not limited to, a thermal printer. The quality level of the print media may then be presented to the printer user. In this way, printer users can become aware of whether the print media loaded into or being used by the printer is high-quality or low-quality print media. After the printer user becomes aware that low-quality print media is loaded into the printer, the user may replace low-quality print media loaded in the printer with high-quality print media such that wear of the printer's components, such as, but not limited to, the thermal print head and cutter blade assembly, is not unduly accelerated.

As mentioned herein above, printer users may be unaware that print media being used or loaded in the printer is low-quality paper or of a type not recommended by the printer's manufacturer. It may be impossible or difficult for a user to detect low-quality paper based on visual inspection alone. Systems and methods in accordance with embodiments of the present invention overcome this difficulty by notifying printer users of low-quality print media. Conversely, systems and methods in accordance with embodiments of the present invention can notify printer users that the print media loaded in the printer is high-quality. As a result, printer users do not have to visually inspect print media to determine the quality level, or check whether the paper is among those approved by the printer manufacturer for use with the printer.

As referred to herein, print media may be any suitable object or material upon which text or images may be printed by a printer. For example, print media includes paper, upon which text or images are produced using ink. Print media may also include thermal paper, which may be printed upon by a thermal printer as understood by those of skill in the art. Thermal printing is a process for producing a printed image on thermal paper by selectively heating thermal paper.

As referred to herein, a printer may be any suitable device for printing images or text to print media. Exemplary printers include a thermal printer, toner-based printers, liquid inkjet printers, solid ink printers, dye-sublimation printers, UV printers, and the like.

Figure 1:
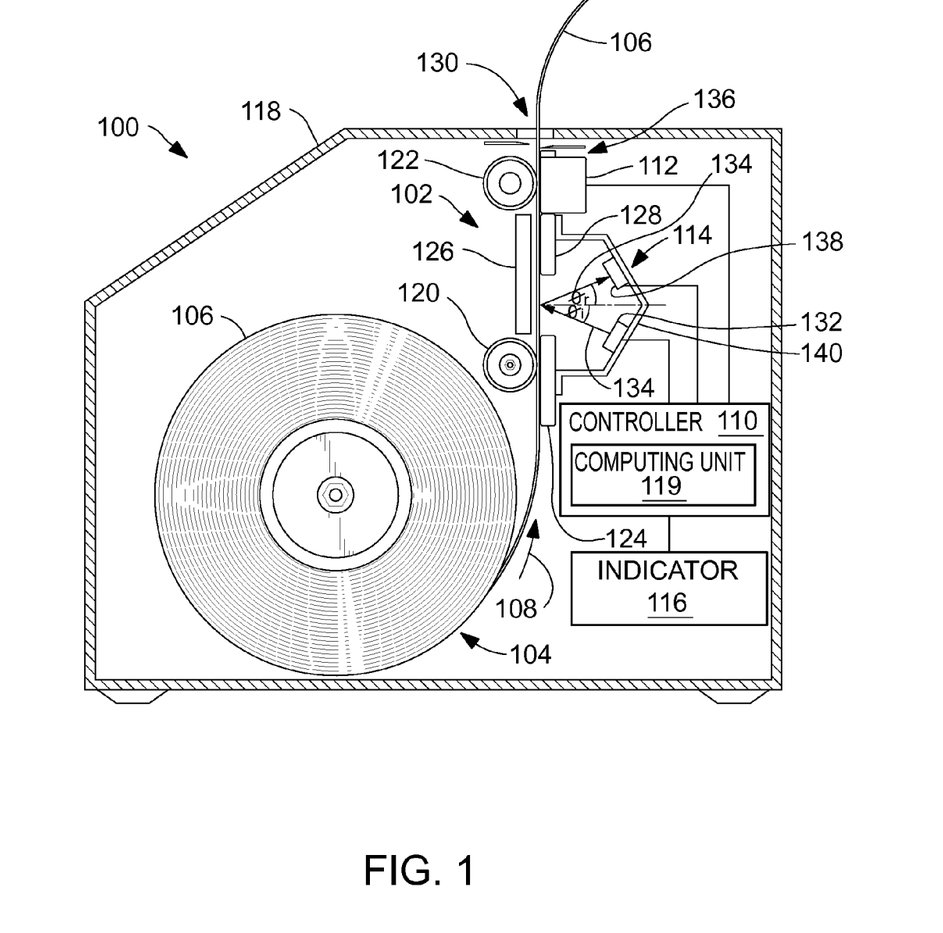
FIG. 1 sets forth a schematic diagram of a printing system for presenting a quality level of print media to a printer user in accordance with embodiments of the present invention.

FIG. 1 sets forth a schematic diagram of a printing system 100 for presenting a quality level of print media to a printer user in accordance with embodiments of the present invention. In this example, printing system 100 is a thermal printer but may alternatively be any other suitable printer. Referring to FIG. 1, printing system 100 may include a printing assembly 102 configured to route paper along a pathway for printing. The printing assembly 102 includes a paper dispenser 104 for storing paper 106 and for dispensing the paper 106 along a pathway in a direction generally indicated by arrow 108. As stored at the dispenser 104, the paper 106 is a continuous, rolled sheet of paper that has not been printed upon. Alternatively, the paper may be other suitable print media stored and dispensed by any suitable paper dispenser as understood by those of skill in the art. For example, the paper 106 may be a plurality of stacked papers stored in a bin or tray.

The system 100 includes a controller 110, a thermal print head 112, a light meter 114, and an indicator 116, all of which may be held and contained within a printer housing 118, shown in cross-section. The controller 110 is communicatively coupled to the thermal print head 112, the light meter 114, the indicator 116, and the printing assembly 102 for electrically transmitting control signals to and receiving data signals from these components. The controller 110 may be configured to perform the functions of routing the paper 106, printing on the paper 106, and controlling the presentation of paper quality information about the paper 106 to a user in accordance with embodiments of the present invention.

In accordance with one or more embodiments of the present invention, the controller 110 may include a computing unit 119, which may include one or more computer readable medium(s). The computing unit 119 may include suitable hardware, such as a processor, and software (including firmware, resident software, micro-code, etc.) for interfacing with and controlling the thermal print head 112, the light meter 114, the indicator 116, and the printing assembly 102. The computing unit 119 may be in operative communication with the indicator 116, which may include a suitable user interface (e.g., a keyboard, a keypad, a display, a mouse, etc.) for presenting information, such as print media quality information and other printing information, to the user and for allowing the user to input commands for controlling functions of the printing system 100.

The controller 110 communicates signals to the printing assembly 102 for controlling the dispensing of the paper 106 from the dispenser 104 and for routing of the paper 106 along the pathway towards the light meter 114 and thermal print head 112. Particularly, the printing assembly 102 may include one or more transports 120 and 122 that are cooperatively functional and controlled by the controller 110 for a portion of the paper 106 such that the end of the paper 106 unrolls from the dispenser 104 in the direction of arrow 108. The printing assembly 102 moves the paper 106 downstream from the dispenser 104 into proximity with the light meter 114 and the thermal print head 112. The transports 120 and 122 may be rollers positioned along the paper pathway and operable with other mechanical components of the printing mechanism 102 to handle the paper 106 for moving the paper 106 along the paper pathway.

The printing assembly 102 may also include one or more guides 124, 126, and 128 positioned along the paper pathway for guiding the paper 106 into proximity with the thermal print head 112 and the light meter 114. The rollers may be suitably attached to a rotational mechanism in communication with the controller 110 for controlling the rate of rotation of the rollers to thereby control the speed at which the paper 106 moves along the pathway. The printing assembly 102 may also include, but not be limited to, feed mechanisms, wheels, bars, tracks, conveyors, and the like for guiding and moving the paper 106 along the pathway. The printer housing 118 may define an opening 130 through which the end of the paper 106 may exit for receipt by a user.

The thermal print head 112 is positioned downstream from the light meter 114 and configured to thermally print images and text to the paper 106. The thermal print head 112 is communicatively coupled to the controller 110 to receive print control signals for printing images and text to the paper 106. Alternative to the thermal print head 112, any suitable printing component known to those of skill in the art may be used for printing to the paper 106.

A cutter assembly 136 is positioned in the print pathway between the thermal print head 112 and the opening 130. The cutter assembly 136 is communicatively coupled to the controller 110 for receiving control signals. The cutter includes one or more blades and a mechanism controllable by the controller 110 for moving the blades to cut the paper 106.

The light meter 114 may function as a specular glossmeter for determining or estimating specular reflection of the paper 106. Particularly, the light meter 114 is controllable by the controller 110 for directing light towards the paper 106 and for detecting light reflected from the paper 106. The light meter 114 includes a light source 132 positioned for generating light 134 and for directing the light 134 towards a surface of the paper 106 as the paper 106 moves along the pathway and in proximity to the light meter 114. The controller 110 communicates control signals to the light source 132 for activating and deactivating the light source 132 and for controlling the intensity of the emitted light 134. The light source 132 may be controlled to generate light having a known intensity $I_O$.

The light 134 emitted by the light source 132 approaches the surface of the paper 106 at an angle of incidence $\theta_i$ of approximately 60 degrees with respect to the surface of the paper 106. The majority of the light 134 reflects off the surface of the paper 106 at approximately 60 degrees. The angle of incidence $\theta_i$ may alternatively be in a range dependent on the print media. Exemplary angles can be between approximately 20 degrees and approximately 85 degrees. In some examples, 45 degree or 75 degree angles may be used.

The light source 132 may be any suitable device for generating light. In one or more embodiments, the light source 132 is a laser generator. In the alternative, the light source 132 may be a light emitting diode (LED) configured with an aspheric lens. The LED may be an LED die including electrical connection points that can be connected to conductive wires, leads, traces, paths, and the like. Another exemplary light source includes, but is not limited to, a laser diode generating visible, infrared, or ultraviolet light.

Low-quality paper tends to have a rougher, more fibrous surface than high-quality paper, which tends to have high gloss. That is, light reflects off the surface of low-quality paper with a broader angular distribution than that of high-gloss paper. The system 100 differentiates between high-quality and low-quality paper by using the light meter 114 to determine or estimate specular reflection of paper. Particularly, the light source 132 applies light 134 to the surface of the paper 106. The light meter 114 includes a light detector 138 configured to detect the light 134 reflected from the surface of the paper 106 for measuring the intensity $I_r$ of the reflected light 106. By measuring the reflected light at an angle of reflection $\theta_r$, the specular reflectance, $R_S$, of the paper 106 can be determined. High-quality paper tends to reflect a majority of the light at the angle of incidence $\theta_i$ of the light. Thus, high-quality paper will have a high specular reflectance. In contrast, low-quality paper with a rougher surface, such as plain paper, tends to diffuse light over a wide area. Thus, low-quality paper will have a low specular reflectance.

The light meter 114 includes a light detector 138 configured to detect the light 134 reflected from the surface of the paper 106 at an angle of reflection $\theta_r$. The light detector 138 is responsive to the detected light 134 and coupled to the controller 110 for communicating to the controller 110 an output signal indicating an intensity measurement of the detected light. The magnitude of the light detector's 138 output signal (e.g., in terms of current or voltage) depends on the reflective characteristic of the paper 106. If the paper 106 has a predominantly specular reflective characteristic or high gloss characteristic, the output of the light detector 138 will be relatively high because a large portion of the incident light is reflected towards the light detector 138. Therefore, if the output of the light detector 138 is relatively high, the paper 106 has a high gloss characteristic.

Conversely, if the paper 106 has a predominantly diffuse reflective characteristic, the output of the light detector 138 will be relatively low because the incident light is scattered in a broad range of directions. The scattering of light reduces the amount of reflected light that reaches the light detector 138. Therefore, if the output of the light detector 138 is relatively low, the paper 106 has a low gloss characteristic.

Surface gloss is the amount of incident light that is reflected at the specular reflectance angle of the mean of a surface. Therefore, specular gloss is proportional to the reflectance of the surface. The Fresnel formula provides the specular reflectance, $R_S$, for an unpolarized light of intensity, $I_O$, at angle of incidence $\theta_i$, giving the intensity of specularly reflected beam of intensity $I_r$, while the refractive index of the surface specimen is m. The Fresnel equation is given as follows:

$$R_S = \frac{I_r}{I_O}$$

The light detector 138 may be any suitable device for receiving and detecting light. In one or more embodiments, the light detector 138 may be a photodetector configured with an aspheric lens. The photodetector may be photodetector die including electrical connections points that can be connected to conductive wires, leads, traces, paths, and the like. The light detector 138 may be, for example, a photocell, photoresistor, or a photomultiplier. The light detector 138 may include an output node to which the controller 110 may be electrically connected for receiving output signals.

The controller 110 controls the indicator 116 to present a quality level of the paper 106 to a user based on the measured characteristic of the light 134. Particularly, the controller 110 may receive the output signal from the light detector 138 and, in response to the output signal, control the indicator 116 to present a paper quality level to the user. Based on the output signal received from the light detector 138, the computing unit 119 determines whether the paper 106 is high-quality or low-quality paper. Particularly, the computing unit 119 compares the measurement indicated by the signal to a predetermined value, and determines that the paper is either low-quality or high-quality based on the comparison.

In one or more embodiments of the present invention, the computing unit 119 uses a signal threshold that is related to print media quality for determining whether paper is high-quality or low-quality. An output signal from the light meter 114 above the signal threshold indicates high-quality paper and an output signal below the signal threshold indicates low-quality paper. In this manner, the computing unit 119 can use the output signal for determining paper quality.

In other embodiments of the present invention, the computing unit 119 determines paper quality by determining the specular reflection or gloss characteristic of the paper 106. Particularly, the output signal of the light meter 114 may indicate a reflected beam of intensity $I_r$ of the light 134. An intensity $I_O$ of light 134 directed to the paper surface may be stored at the computing unit 119 or indicated in a signal received from the light meter 114. By applying Fresnel's equation, the computing unit 119 determines the specular reflectance $R_S$ by dividing the relative intensity $I_r$ by the unpolarized light of intensity $I_O$. The computing unit 119 compares the specular reflectance to one or more thresholds. If the specular reflectance is above a threshold, the computing unit 119 determines that the paper is high-quality. If the specular reflectance is below a threshold, the computing unit 119 determines that the paper is low-quality.

The indicator 116 may be in operative communication with the controller 110 for receiving signals to indicate paper quality. The indicator 116 may include a display or other suitable device for presenting to a user that the paper 106 is high-quality or low-quality in response to signals from the controller 110. In one or more embodiments, the display may be text information or other suitable indicia, such as an icon, for indicating to the user that the paper 106 is high or low-quality. In the alternative, an LED may be activated to indicate either high or low-quality. In this way, the printer user is notified of the quality level of the paper 106. Upon notification of the quality level, the printer users can choose to replace low-quality paper to avoid accelerating the wear of the thermal print head 112 and the cutter assembly 136.

In one or more embodiments of the present invention, the computing unit 119 determines the amount of low-quality and high-quality paper used for printing by the system 100 and stores this information in memory. Particularly, the system 100 determines whether paper being used is low-quality or high-quality in accordance with embodiments of the present invention. The system 100 then determines the amount of the low-quality and high-quality paper used for printing. The system 100 may estimate the amount of paper used during a low-quality or high-quality condition. This information may be signaled to the indicator 116, which may present this information to the user.

In one or more embodiments of the present invention, the computing unit 119 of the controller 110 may estimate the amount of paper used by counting the number of cuts of the paper by the cutter assembly 136. The computing unit 119 may count the number of times that control signals for cutting the paper are sent to the cutter assembly 136 and estimate the length of used paper based on the count. The number of cuts may be counted while low-quality paper or high-quality paper is being used. The computing unit 119 may associate the number of cuts with the quality of the paper and store the information in memory. This information may be presented to the user via the indicator 116.

Alternatively, the computing unit 119 may estimate the amount of paper used by counting the number of characters printed on the paper by the thermal print head 112. The computer unit 119 may count the number of times that control signals for printing a character are sent to the thermal print head 112 and use the count for estimating the paper length. The computing unit 119 may associate the number of characters printed with the quality of the paper and store the information in memory. Another example of a technique for estimating an amount of paper used is to measure rotations of rollers in a printing mechanism. Other techniques for estimating an amount of paper used is known to those of skill in the art may also be used. Information about these estimates may be presented to the user via the indicator 116.

The computing unit 119 may also determine a ratio of the amount of high-quality paper used to the amount of low-quality paper used, or another comparison measurement of the different qualities of paper used. In one or more embodiments, the amounts of low-quality and high-quality papers used may be used for determining the ratio. The indicator 116 may present this comparison measurement to the user. The warranty of the system 100 or its components may be affected if the ratio of low-quality paper amount to high-quality paper amount is high.

In one or more embodiments of the present invention, the light meter 114 may include a frame 140 for attaching the light source 132 and light detector 138 to the housing 118. The frame 140 holds the light source 132 in position such that the light source 132 directs the light 134 to the paper's surface at an angle in accordance with embodiments of the present invention. In addition, the frame 140 holds the light detector 138 in position such that the light detector 138 receives the reflected light 134 at an angle of reflection $\theta_r$, in accordance with embodiments of the present invention. Other components of the system 100 may also be held to the housing 118 by suitable attachment mechanisms.

In accordance with embodiments of the present invention, a user may be notified when a defective portion of paper has been identified. Particularly, high-quality or low-quality paper may include a segment having a manufacturing defect. The light meter 114 may detect defective portions in accordance with the present invention. Subsequently, the user may be notified of the defective segment via the indicator 116.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As mentioned above, exemplary methods for indicating print media quality to printer users in accordance with embodiments of the present invention are described with reference to the accompanying drawings. For further explanation, FIG. 2 sets forth a flow chart illustrating an exemplary method of indicating print media quality to a printer user according to embodiments of the present invention. The method of FIG. 2 includes routing 200 print media along a pathway. For example, the printing assembly 102 may be used for routing paper 106 along the pathway in a direction indicated by arrow 108.

The print media may be routed along the pathway to a location where a portion of the print media is illuminated with light. For example, the light may be generated by the light source 132 and directed to the paper 106. The method of FIG. 2 includes detecting 202 light reflected from the print media. For example, the light detector 138 may detect light reflected from the surface of paper 106 that was generated by the light source 132.

Figure 2:
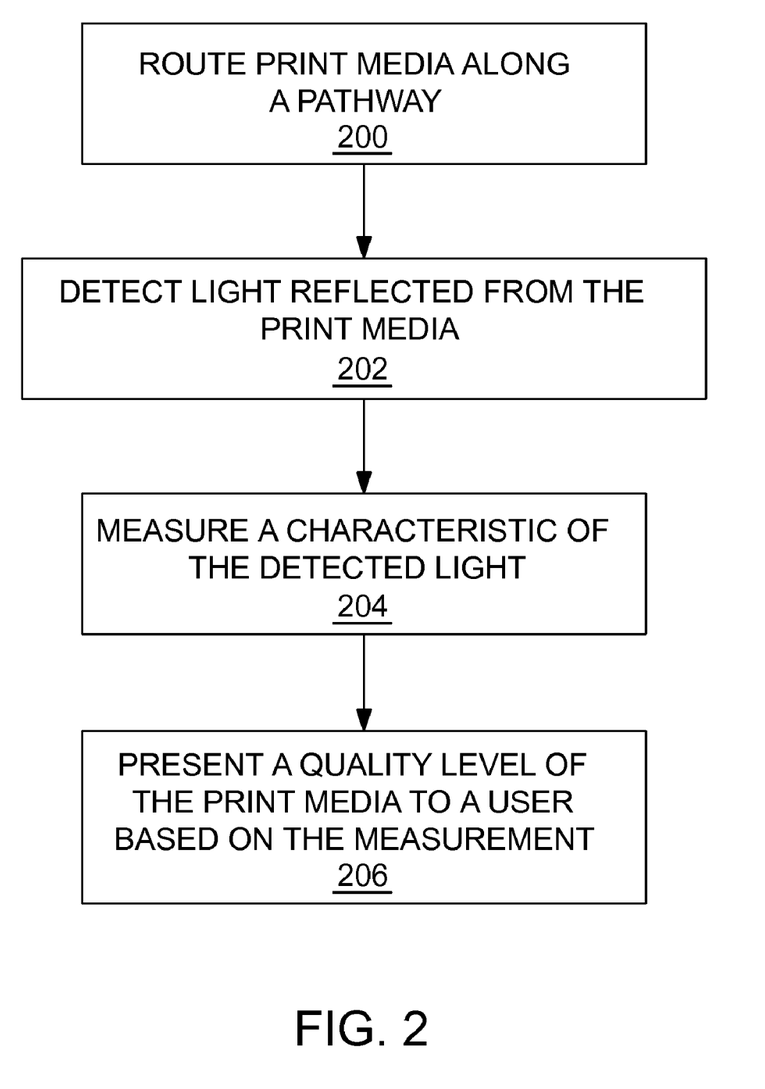
FIG. 2 sets forth a flow chart illustrating an exemplary method of indicating print media quality to a printer user according to embodiments of the present invention.

After detection of the light reflected from the print media according to embodiments of the present invention, the method of FIG. 2 includes measuring 204 a characteristic of the detected light for determining a quality level of the print media. For example, the light meter 114 may measure an intensity of the light reflected from the paper 106. The computing unit 119 may use the measurement for determining a quality level of the paper 106.

Next, the method of FIG. 2 includes presenting 206 a quality level of the print media to a user based on the measurement. For example, the computing unit 119 can transmit signals to the indicator 116 in response to determining a poor or high-quality level of the paper 106. In response to receiving the signal, the indicator 116 can present the quality level of the paper 106 to a user.

As mentioned above, embodiments of the present invention may indicate to printer users the amount of high-quality and low-quality print media that has been used by a printing system. In addition, embodiments of the present invention may indicate a relationship of the amount of high-quality print media that has been used in comparison to the low-quality print media. For further explanation, FIG. 3 sets forth a flow chart illustrating an exemplary method of indicating an amount of high-quality and low-quality paper used by a printing system according to embodiments of the present invention. The method of FIG. 3 also indicates a ratio of the amount of high-quality paper used to the amount of low-quality paper used, or another comparison measure of the different qualities of paper used.

Figure 3:
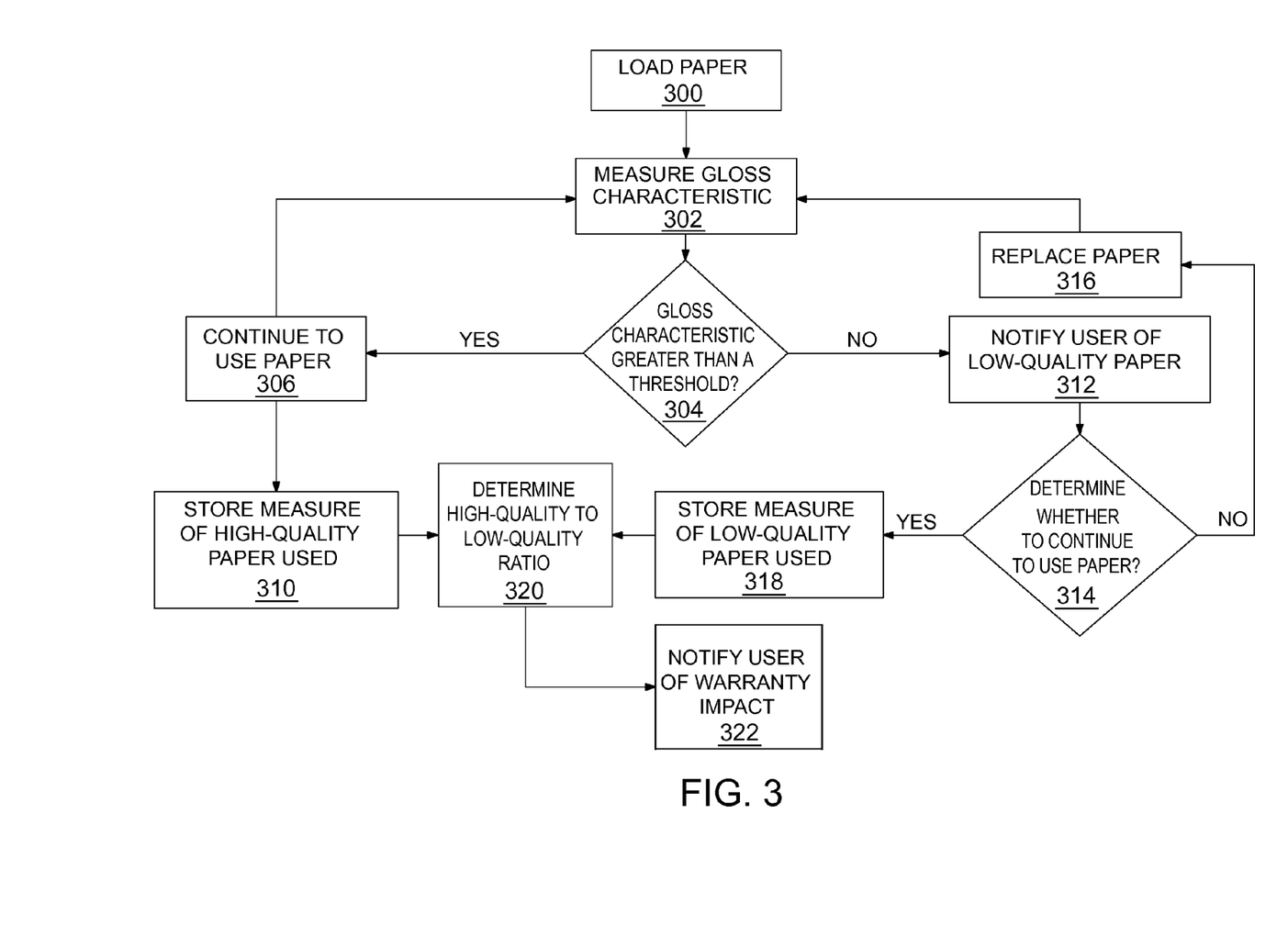
FIG. 3 sets forth a flow chart illustrating an exemplary method of indicating an amount of high-quality and low-quality paper used by a printing system according to embodiments of the present invention.

Referring to FIG. 3, the method includes loading 300 paper into a printing system. For example, a user of printing system 100 may load the paper 106 onto the paper dispenser 104. The user may also suitably insert an end of the paper 106 into the printing assembly 102 such that the printing assembly 102 can pull the end of the paper 106 downstream for print processing.

After the end of the paper 106 is pulled downstream from the paper dispenser 104 and into proximity with the light meter 114, the method of FIG. 3 includes measuring 302 a gloss characteristic of the paper 106. For example, the light source 132 may generate the light 134 and direct the light 134 towards the paper 106 in accordance with embodiments of the present invention. The light detector 138 detects light reflected from the paper 106 and, in response to the detection, generates an output signal indicative of the intensity of the detected light 134. The output signal is indicative of a gloss characteristic of the paper 106.

Further, the method of FIG. 3 includes determining 304 whether the gloss characteristic is greater than a threshold. For example, the computing unit 119 may receive the output signal from the light detector 138. The computing unit 119 may also compare the output signal to a threshold for determining whether the output signal is greater than the threshold.

In response to determining that the output signal is greater than the threshold, the method of FIG. 3 includes continuing 306 to use the paper. For example, the printing system 100 may continue printing if it is determined that the output signal is greater than the threshold. This determination means that the paper 106 is high-quality. The computing unit 119 may also control the indicator 116 to notify the user that the paper 106 is high-quality in accordance with embodiments of the present invention. The method of FIG. 3 may then return to the measuring step 302. The method also includes storing 310 the amount of high-quality paper used in accordance with embodiments of the present invention.

In contrast to determining that the output signal is greater than the threshold, the method of FIG. 3 includes notifying 312 the user of low-quality paper if it is determined that the output signal is not greater than the threshold. For example, the computing unit 119 may control the indicator 116 to notify the user that the paper 106 is low-quality in accordance with embodiments of the present invention.

If it is determined the paper is low-quality, the method of FIG. 3 includes determining 314 whether to continue to use the paper. For example, the user of the printing system 100 may decide not to use the paper 106 upon receiving notification that the paper is low-quality. In this case, the user may replace 316 the paper with a different type of paper. If the user continues to operate the printing system using low-quality paper, the method of FIG. 3 includes storing 318 a measure of the amount of low-quality paper used in accordance with embodiments of the present invention.

After determining one or both of an amount of high-quality paper used and an amount of low-quality paper used, the method of FIG. 3 includes determining 320 a ratio of the amount of high-quality paper used to the amount of low-quality paper used. For example, the computing unit 119 may determine this ratio in accordance with embodiments of the present invention. The computing unit 119 may then notify 322 a user of the impact on the printing system's warranty based on the ratio. The warranty may be reduced if a certain amount of low-quality paper is used. The user may be notified of the impact of using low-quality paper and its affect on the warranty by presentation of the information via the indicator 116.

Experiments have been performed for testing systems and methods in accordance with the present invention. Particularly, several paper types of known quality were used for testing. Table 1 below sets forth experimental results for seven paper types at 60 and 80 degrees angle of incidence applied by a light source. For the purposes of the experiment, high-quality paper is paper that is manufacturer-approved for use in a printing system. Low-quality paper is paper that is not manufacturer-approved. The gloss characteristic is a unit for measuring paper gloss and based on an intensity of light applied to the paper and an intensity of light reflected from the paper in accordance with embodiments of the present invention.

TABLE 1

| Paper Quality | Gloss Characteristic at 60° | Gloss Characteristic at 85° |
|---|---|---|
| High | 4.3 | 25.8 |
| High | 4.3 | 26.9 |
| High | 4.3 | 33.3 |

TABLE 1-continued

| Paper Quality | Gloss Characteristic at 60° | Gloss Characteristic at 85° |
|---|---|---|
| Low | 3.3 | 28.3 |
| Low | 3.1 | 24.8 |
| Low | 3.7 | 5.3 |
| Low | 3.3 | 28.3 |

Based on these experimental results, it can be seen that the difference between high-quality paper and low-quality paper at an angle of incidence of 85 degrees may be statistically insignificant. However, the difference at an angle of incidence of 60 degrees is statistically significant at the 95-99% confidence interval. This data implies that use of a 60 degree angle of incidence in accordance with embodiments of the present invention can be used for distinguishing between high-quality and low-quality paper.

In view of the explanations and experimental results set forth above, readers will recognize that the benefits of the systems and methods according to embodiments of the present invention for indicating print media quality to printer users include: simple methods for indicating paper quality to a user during printing; and reducing the likelihood that users will mistakenly use low-quality paper for printing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a printing assembly configured to route print media along a pathway for printing;
   a light meter configured to detect light reflected from the print media, and to measure a characteristic of the detected light;
   a computing unit configured to determine first and second quality levels of the print media based on the measured characteristic, and configured to compare an amount of print media routed through the pathway at the first quality level with an amount of print media routed through the pathway at the second quality level; and
   an indicator coupled to the light meter, and configured to present the comparison of the first and second quality levels of the print media to a user.

2. The system of claim 1, wherein the indicator is configured to:
   compare the measured characteristic of the detected light to a predetermined value; and
   present one of the first and second quality levels of the print media to the user based on the comparison to the predetermined value.

3. The system of claim 1, wherein the light meter is configured to measure a gloss characteristic of the print media based on the detected light, and
   wherein the indicator is configured to present one of the first and second quality levels of the print media to the user based on the gloss characteristic measurement.

4. The system of claim 1, wherein the light meter comprises a light source configured to generate and direct light to a surface of the print media, and
   wherein the printing assembly is configured to route the print media such that the surface of the print media intercepts the light from the light source.

5. The system of claim 1, wherein the light meter comprises a light source configured to generate and direct light to a surface of the print media at an angle of incidence of approximately 60 degrees with respect to the surface of the print media.

6. The system of claim 5, wherein the light meter comprises a light detector positioned to receive the light at an angle of reflection of approximately 60 degrees with respect to the surface of the print media.

7. The system of claim 1, further comprising a computing unit configured to:
   determine the quality level of the print media based on the measured characteristic of the detected light;
   measure an amount of the print media processed by the printing assembly at the determined quality level; and
   associate the amount of processed print media with the quality level of the print media.

8. The system of claim 1, further comprising a computing unit configured to:
   receive a first measurement of a detected light characteristic of a first print media;
   receive a second measurement of a detected light characteristic of a second print media, wherein the second print media differs from the first print media;

determine quality levels of the first print media and second print media, wherein the quality level of the first print media differs from the quality level of the second print media; and compare the quality levels of the first print media and second print media to generate a comparison measure, and wherein the indicator is configured to present the comparison measure to the user.

9. A method comprising:
routing print media along a pathway;
detecting light reflected from the print media;
measuring a characteristic of the detected light;
determining first and second quality levels of the print media based on the measured characteristic;
comparing an amount of print media routed through the pathway at the first quality level with an amount of print media routed through the pathway at the second quality level; and
presenting the comparison of the first and second quality levels of the print media to a user.

10. The method of claim 9, further comprising comparing the measured characteristic of the detected light to a predetermined value, and
further comprising presenting one of the first and second quality levels of the print media to the user based on the comparison to the predetermined value.

11. The method of claim 9, wherein measuring a characteristic of the detected light comprises measuring a gloss characteristic of the print media based on the detected light, and
wherein presenting the comparison comprises presenting one of the first and second quality levels of the print media to the user based on the gloss characteristic measurement.

12. The method of claim 9, further comprising:
generating light;
directing the light to a surface of the print media; and
routing the print media such that the surface of the print media intercepts the light from the light source.

13. The method of claim 9, further comprising:
generating light; and
directing the light to a surface of the print media at an angle of incidence of approximately 60 degrees with respect to the surface of the print media.

14. The method of claim 13, further comprising, at a light detector, receiving the light at an angle of reflection of approximately 60 degrees with respect to the surface of the print media.

15. The method of claim 9, further comprising:
determining the quality level of the print media based on the measured characteristic of the detected light;
measuring an amount of the print media processed by the printing assembly; and
associating the amount of processed printed media with the quality level of the print media.

16. The method of claim 9, further comprising:
receiving a first measurement of a detected light characteristic of first print media;
receiving a second measurement of a detected light characteristic of second print media, wherein the second print media differs from the first print media;
determining quality levels of the first print media and second print media, wherein the quality level of the first print media differs from the quality level of the second print media;
comparing the quality levels of the first print media and second print media to generate a comparison measure; and
presenting the comparison measure to the user.

\* \* \* \* \*